United States Patent
Fukukawa et al.

(10) Patent No.: US 9,850,346 B2
(45) Date of Patent: Dec. 26, 2017

(54) TRANSPARENT POLYIMIDE AND PRECURSOR THEREOF

(71) Applicant: Mitsui Chemicals, Inc., Minato-ku, Tokyo (JP)

(72) Inventors: Kenichi Fukukawa, Tokyo (JP); Masaki Okazaki, Chiba (JP); Yoshihiro Sakata, Ichikawa (JP); Tatsuhiro Urakami, Ichihara (JP); Atsushi Okubo, Itabashi (JP)

(73) Assignee: MITSUI CHEMICALS, INC., Tokyo (JP)

( * ) Notice: Subject to any disclaimer, the term of this patent is extended or adjusted under 35 U.S.C. 154(b) by 34 days.

(21) Appl. No.: 14/889,393

(22) PCT Filed: May 9, 2014

(86) PCT No.: PCT/JP2014/062474
§ 371 (c)(1),
(2) Date: Nov. 5, 2015

(87) PCT Pub. No.: WO2014/185353
PCT Pub. Date: Nov. 20, 2014

(65) Prior Publication Data
US 2016/0115276 A1    Apr. 28, 2016

(30) Foreign Application Priority Data
May 14, 2013  (JP) .................. 2013-102200

(51) Int. Cl.
| | |
|---|---|
| C08L 77/06 | (2006.01) |
| C08G 69/26 | (2006.01) |
| C09D 179/08 | (2006.01) |
| C08G 73/10 | (2006.01) |
| C08K 3/00 | (2006.01) |
| C08G 69/48 | (2006.01) |
| C08J 5/18 | (2006.01) |
| C09D 177/06 | (2006.01) |

(52) U.S. Cl.
CPC ............ *C08G 69/26* (2013.01); *C08G 69/48* (2013.01); *C08G 73/1042* (2013.01); *C08G 73/1053* (2013.01); *C08G 73/1064* (2013.01); *C08G 73/1082* (2013.01); *C08J 5/18* (2013.01); *C08K 3/0033* (2013.01); *C08L 77/06* (2013.01); *C09D 177/06* (2013.01); *C09D 179/08* (2013.01); *C08J 2377/06* (2013.01); *C08J 2379/08* (2013.01)

(58) Field of Classification Search
CPC ....... C08L 79/08; C08L 77/06; C09D 179/08; C09D 177/06; C08G 73/10; C08G 73/1042
See application file for complete search history.

(56) References Cited

U.S. PATENT DOCUMENTS

2011/0318588 A1*  12/2011  Fukukawa ............ B32B 15/08
                                                        428/458

FOREIGN PATENT DOCUMENTS

| JP | 2002-161136 A | 6/2002 |
|---|---|---|
| JP | 2003-141936 A | 5/2003 |
| JP | 2012-255985 | * 12/2012 |
| JP | 2012-255985 A | 12/2012 |
| JP | 2013-079344 A | 5/2013 |
| WO | WO 2010/100874 A1 | 9/2010 |
| WO | WO 2013/051213 A1 | 4/2013 |

OTHER PUBLICATIONS

International Search Report (PCT/ISA/210) dated Aug. 5, 2014, by the Japanese Patent Office as the International Searching Authority for International Application No. PCT/JP2014/062474.

* cited by examiner

*Primary Examiner* — Gregory Listvoyb
(74) *Attorney, Agent, or Firm* — Buchanan, Ingersoll & Rooney PC

(57) ABSTRACT

Provided is a polyimide excellent in heat resistance and colorless transparency and also excellent in flexibility and ultraviolet ray transmittance. The polyimide includes a structural unit represented by Formula (1a) and a structural unit represented by Formula (1b) wherein R is a specific aromatic group.

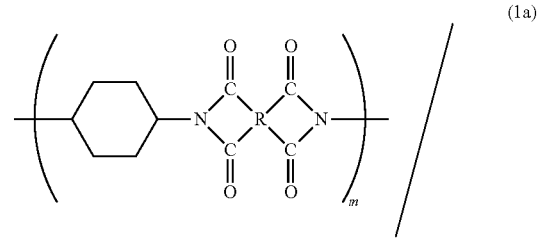

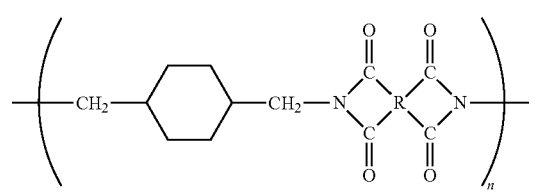

13 Claims, No Drawings

TRANSPARENT POLYIMIDE AND PRECURSOR THEREOF

TECHNICAL FIELD

The present invention relates to a transparent polyimide and its precursor which is a polyamic acid, as well as their uses.

BACKGROUND ART

Polyimides generally have excellent heat resistance, mechanical properties and electric properties. For this reason, polyimides are widely used as e.g., a molding material or a composite material, for various applications including electric/electronic materials and optical materials.

Of these polyimides, polyimides obtained by reacting an alicyclic diamine with an aromatic tetracarboxylic acid have relatively high transparency and future applications thereof to uses including electric/electronic materials and optical materials have been looked forward to (for example, see Patent Literature 1 and Patent Literature 2).

These polyimides with excellent transparency are being studied for uses, for example, in circuit substrates such as suspension substrates for HDD, semiconductor package substrates and substrates for flexible display. These circuit substrates generally have a polyimide resin layer that has been patterned. Since mounting of various electronic parts on these circuit substrates needs heating operation, the polyimide resin layer is required to have heat resistance. With recent environmental concern in particular, a solder used in electronic circuits has been mainly lead-free, and accordingly the solder reflow temperature shifts toward the higher temperature side. It has been therefore demanded to obtain polyimides with higher heat resistance than conventional ones, for example, with a glass transition temperature (Tg) of not less than 260° C.

In general, the patterning of the polyimide resin layer is performed by exposing via a photomask a photosensitive resin layer containing an ultraviolet ray polymerizable compound which is formed on the polyimide resin layer, the transparency of the polyimide being taken advantage of, and then performing development (etching) treatment using an alkali solution. As such, desired are polyimides having not just light transmittance but also high ultraviolet ray transmittance.

In use of the polyimides as circuit substrates with their space for electric/electronic parts being narrow or complicatedly-shaped for the mounting of various electronic parts, the polyimides are expected to be used in parts requiring flexibility (e.g., parts connecting a head portion with a body of a printer), and therefore are required to be excellent in flexibility, too.

CITATION LIST

Patent Literature

[Patent Literature 1] JP-A-2003-141936
[Patent Literature 2] WO 2010/100874

SUMMARY OF INVENTION

Technical Problem

However, it has been difficult for conventional transparent polyimides to have flexibility and high ultraviolet ray transmittance while maintaining high heat resistance and colorless transparency.

The present invention has been made in view of the above circumstance. It is an object of the present invention to provide a polyimide excellent in heat resistance and colorless transparency and also excellent in flexibility and ultraviolet ray transmittance.

Technical Solution

The present inventors studied in order to solve the above-identified problem, and have found that the problem can be solved by a polyimide having a skeleton derived from a specific alicyclic diamine and a specific aromatic tetracarboxylic dianhydride, thereby perfecting the present invention.

That is, the present invention includes matters described below.

[1] A polyimide comprising a structural unit represented by Formula (1a) and a structural unit represented by Formula (1b),

[Chem. 1]

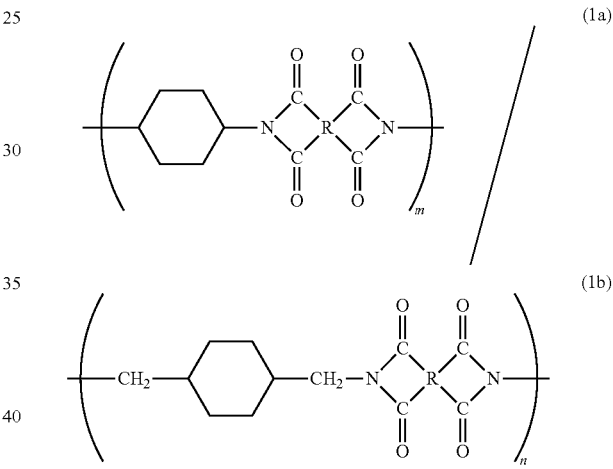

wherein in Formulae (1a) and (1b), R is a group represented by Formula (x1), (x2) or (x3),

[Chem. 2]

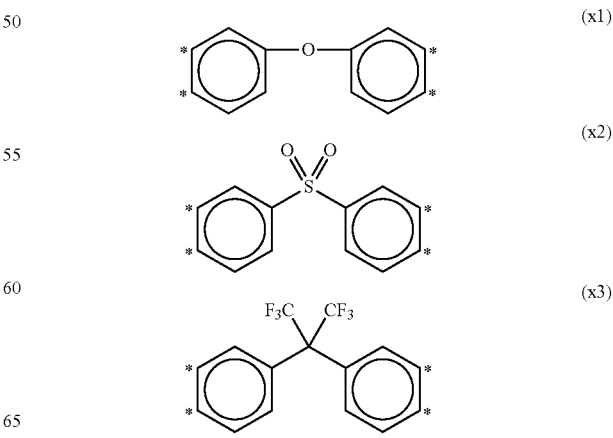

wherein in Formulae (x1), (x2) and (x3), * is a carbon atom bonding to a carbon atom of C=O adjacent to R, and when plural Rs are contained, those groups may be the same or different from each other, m is a molar ratio of the structural unit represented by Formula (1a) relative to the total of the structural unit represented by Formula (1a) and the structural unit represented by Formula (1b), n is a molar ratio of the structural unit represented by Formula (1b) relative to the total of the structural unit represented by Formula (1a) and the structural unit represented by Formula (1b) (m+n=100%) wherein m/n ranges from 99.9/0.1 to 50.0/50.0, the structural unit represented by Formula (1a) and the structural unit represented by Formula (1b) are bonded to each other, and the bonding form may be random or block-wise, a cyclohexane skeleton (y) in Formula (1a) comprises 60% to 100% of a trans isomer represented by Formula (y1) and 40% to 0% of a cis isomer represented by Formula (y2) wherein the trans isomer and the cis isomer total 100%, and

[Chem. 3]

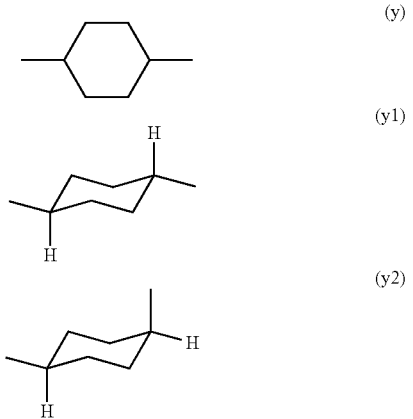

a 1,4-bismethylenecyclohexane skeleton (z) in Formula (1b) comprises 60% to 100% of a trans isomer represented by Formula (z1) and 40% to 0% of a cis isomer represented by Formula (z2) wherein the trans isomer and the cis isomer total 100%.

[Chem. 4]

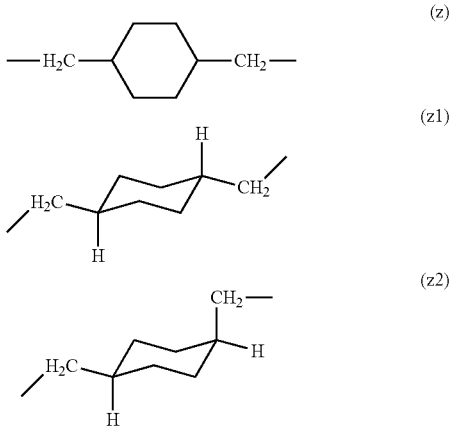

[2] The polyimide described in [1], wherein in Formulae (1a) and (1b), R is a group represented by Formula (x1).

[3] A polyamic acid comprising a structural unit represented by Formula (2a) and a structural unit represented by Formula (2b),

[Chem. 5]

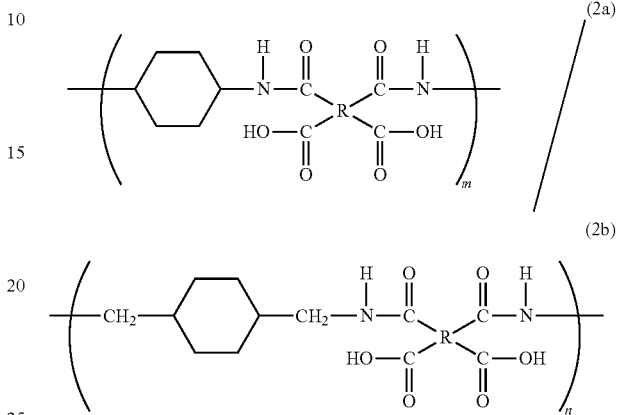

wherein in Formula (2a) and (2b), R is a group represented by Formula (x1), (x2) or (x3),

[Chem. 6]

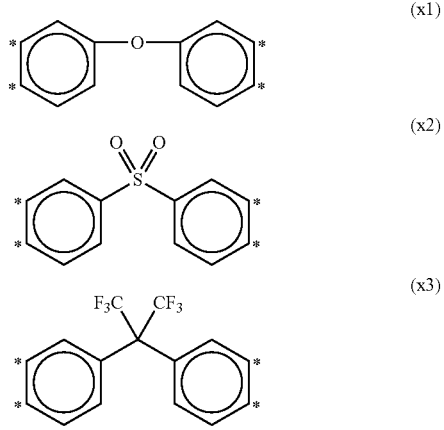

wherein in Formulae (x1), (x2) and (x3), * is a carbon atom bonding to a carbon atom of C=O adjacent to R, and when plural Rs are contained, those groups may be the same or different from each other, m is a molar ratio of the structural unit represented by Formula (2a) relative to the total of the structural unit represented by Formula (2a) and the structural unit represented by Formula (2b), n is a molar ratio of the structural unit represented by Formula (2b) relative to the total of the structural unit represented by Formula (2a) and the structural unit represented by Formula (2b) wherein m/n ranges from 99.9/0.1 to 50.0/50.0, the structural unit represented by Formula (2a) and the structural unit represented by Formula (2b) are bonded to each other, and the bonding form may be random or block-wise, a cyclohexane skeleton (y) in Formula (2a) comprises 60% to 100% of a trans isomer represented by Formula (y1)

and 40% to 0% of a cis isomer represented by Formula (y2) wherein the trans isomer and the cis isomer total 100%, and

[Chem. 7]

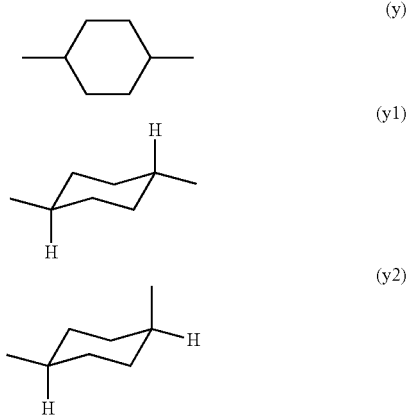

a 1,4-bismethylenecyclohexane skeleton (z) in Formula (2b) comprises 60% to 100% of a trans isomer represented by Formula (z1) and 40% to 0% of a cis isomer represented by Formula (z2) wherein the trans isomer and the cis isomer total 100%.

[Chem. 8]

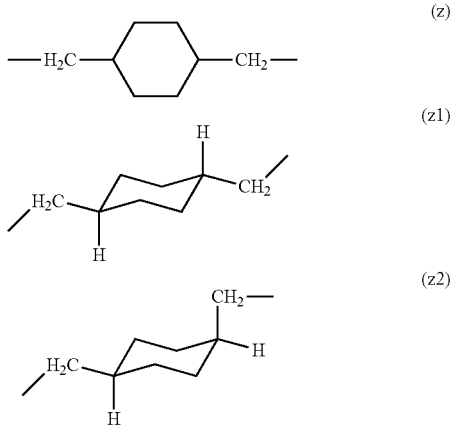

[4] The polyamic acid described in [3], wherein in the Formulae (2a) and (2b), R is a group represented by Formula (x1).

[5] A polyimide composition comprising the polyimide described in [1] or [2] and an inorganic filler.

[6] A polyamic acid composition comprising the polyamic acid described in [3] or [4] and an inorganic filler.

[7] A process for producing the polyamic acid described in [3], comprising a step of allowing a diamine mixture containing 1,4-cyclohexanediamine and 1,4-bis(aminomethyl)cyclohexane such that a molar ratio of 1,4-cyclohexanediamine/1,4-bis(aminomethyl)cyclohexane ranges from 99.9/0.1 to 50.0/50.0 to react with a tetracarboxylic dianhydride containing at least one selected from bis(3,4-dicarboxyphenyl)ether dianhydride, 3,3',4,4'-diphenylsulfonetetracarboxylic dianhydride and 2,2-bis(3,4-dicarboxyphenyl)-1,1,1,3,3,3-hexafluoropropane dianhydride.

[8] A process for producing the polyimide described in [1], comprising:

a step of allowing 1,4-cyclohexanediamine to react with a tetracarboxylic dianhydride containing at least one selected from bis(3,4-dicarboxyphenyl)ether dianhydride, 3,3',4,4'-diphenylsulfonetetracarboxylic dianhydride and 2,2-bis(3,4-dicarboxyphenyl)-1,1,1,3,3,3-hexafluoropropane dianhydride, to produce a polyamic acid (1) containing a structural unit represented by Formula (3a);

a step of allowing 1,4-bis(aminomethyl)cyclohexane to react with a tetracarboxylic dianhydride containing at least one selected from bis(3,4-dicarboxyphenyl)ether dianhydride, 3,3',4,4'-diphenylsulfonetetracarboxylic dianhydride and 2,2-bis(3,4-dicarboxyphenyl)-1,1,1,3,3,3-hexafluoropropane dianhydride, to produce a polyamic acid (2) containing a structural unit represented by Formula (3b);

a step of mixing the polyamic acid (1) with the polyamic acid (2) such that a molar ratio of the structural unit represented by Formula (3a)/the structural unit represented by Formula (3b) ranges from 99.9/0.1 to 50.0/50.0, to produce a polyamic acid mixture, and a step of imidizing the polyamic acid mixture,

[Chem. 9]

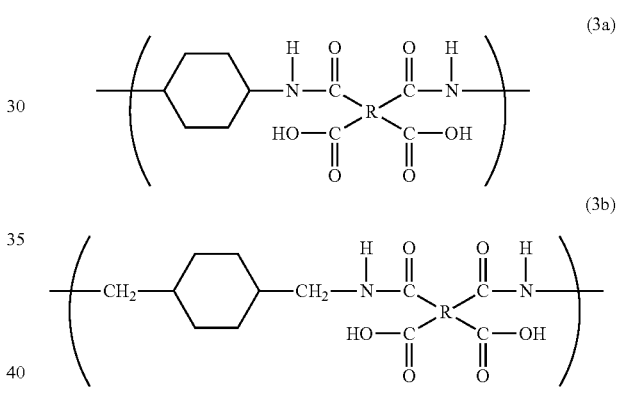

wherein in Formulae (3a) and (3b), R is a group represented by Formula (x1), (x2) or (x3),

[Chem. 10]

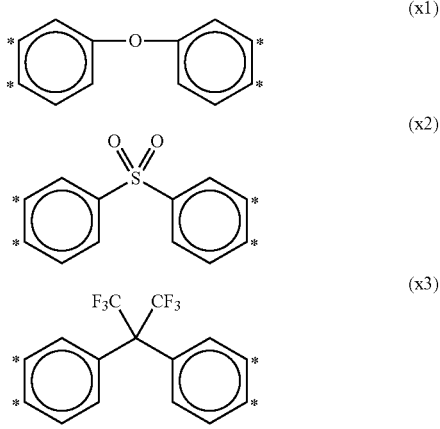

wherein in Formulae (x1), (x2) and (x3), * is a carbon atom bonding to a carbon atom of C=O adjacent to R, and when plural Rs are contained in the polymer, those groups may be the same or different from each other.

[9] A polyamic acid varnish comprising the polyamic acid described in [3] or [4] and a solvent.

[10] A dry film comprising the polyamic acid described in [3] or [4].

[11] A film comprising the polyimide described in [1] or [2], or the polyimide composition described in [5].

[12] An optical film comprising the film described in [11].

[13] A substrate for a flexible display, comprising the optical film described in [12].

Effects of Invention

The polyimide obtained according to the present invention is excellent not just in heat resistance and colorless transparency, but also in flexibility and ultraviolet ray transmittance, particularly transmittance of long-wavelength ultraviolet ray (for example ultraviolet ray at 365 nm).

DESCRIPTION OF EMBODIMENTS

The polyimide of the present invention is characterized by containing the structural unit represented by Formula (1a) and the structural unit represented by Formula (1b).

[Chem. 11]

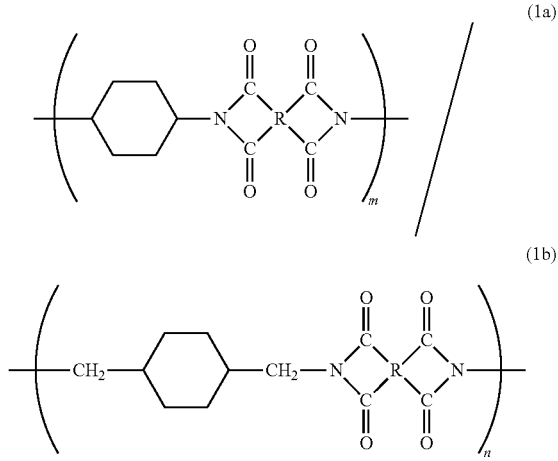

In Formulae (1a) and (1b), R is a group represented by Formula (x1), (x2) or (x3); and in Formulae (x1), (x2) and (x3), * is a carbon atom bonding to a carbon atom of C=O adjacent to R of Formulae (1a) and (1b).

[Chem. 12]

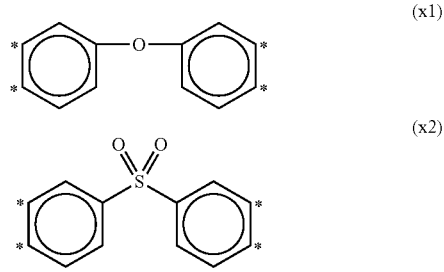

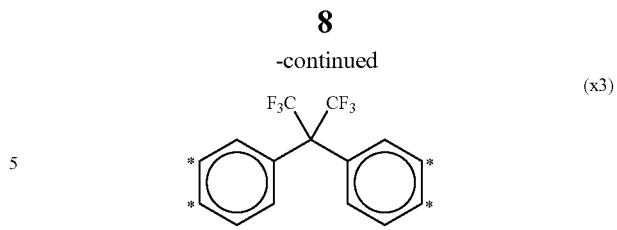

In Formulae (x1), (x2) and (x3), * is a carbon atom bonding to a carbon atom of C=O adjacent to R. In Formulae (1a) and (1b), when plural Rs are contained, those groups may be the same or different from each other, and R contained in Formula (1a) may be the same or different from R contained in Formula (1b).

The structural unit represented by Formula (1a) is a structural unit obtained from the reaction between 1,4-cyclohexanediamine and at least one tetracarboxylic dianhydride selected from bis(3,4-dicarboxyphenyl)ether dianhydride (also known as 4,4'-oxydiphthalic anhydride), 3,3',4,4'-diphenylsulfonetetracarboxylic dianhydride and 2,2-bis(3,4-dicarboxyphenyl)-1,1,1,3,3,3-hexafluoropropane dianhydride (also known as 4,4'-(hexafluoroisopropylidene)diphthalic anhydride). When the polyimide of the present invention contains plural structural units represented by Formula (1a), the structural units derived from the tetracarboxylic dianhydride may be formed from a single kind of tetracarboxylic dianhydride, or may be formed from two or more kinds of tetracarboxylic dianhydrides.

The structural unit represented by Formula (1b) is a structural unit obtained from the reaction between 1,4-bis(aminomethyl)cyclohexane and at least one acid anhydride selected from bis(3,4-dicarboxyphenyl)ether dianhydride, 3,3',4,4'-diphenylsulfonetetracarboxylic dianhydride and 2,2-bis(3,4-dicarboxyphenyl)-1,1,1,3,3,3-hexafluoropropane dianhydride. When the polyimide of the present invention contains plural structural units represented by Formula (1b), the structural units derived from the tetracarboxylic dianhydride may be formed from a single kind of tetracarboxylic dianhydride, or two or more kinds of tetracarboxylic dianhydrides.

The group derived from the tetracarboxylic dianhydride in the Formula (1a) may be the same or different from the group derived from the tetracarboxylic dianhydride in Formula (1b).

The polyimide of the present invention, due to containing these two kinds of structural units, is excellent not just in heat resistance and colorless transparency, but also in flexibility and ultraviolet ray transmittance, particularly, transmittance of long-wavelength ultraviolet ray (for example, ultraviolet ray at 365 nm).

The cyclohexane skeleton (y) in Formula (1a) comprises 60% to 100% of a trans isomer represented by Formula (y1) and 40% to 0% of a cis isomer represented by Formula (y2), wherein the trans isomer and the cis isomer total 100%.

[Chem. 13]

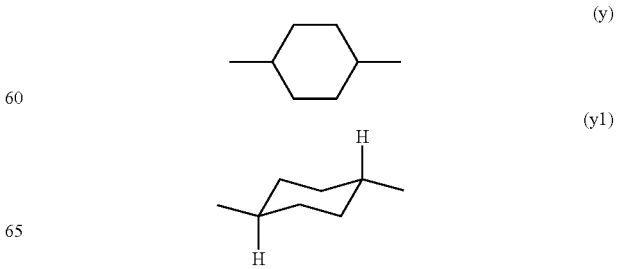

-continued

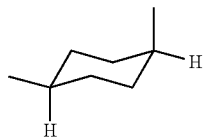

(y2)

By the ratio of the trans isomer falling within the range in the cyclohexane skeleton, the resulting polyimide is readily allowed to have increased molecular weight, easily giving films with self-supporting property. In terms of easily allowing the polyimide to have increased molecular weight, it is preferred that the ratio of the trans isomer be 70% to 100% and the ratio of the cis isomer be 30% to 0%, and it is more preferred that the ratio of the trans isomer be 80% to 100% and the ratio of the cis isomer be 20% to 0%.

The 1,4-bismethylenecyclohexane skeleton (z) in Formula (1b) comprises 60% to 100% of a trans isomer represented by Formula (z1) and 40% to 0% of a cis isomer represented by Formula (z2), wherein the trans isomer and the cis isomer total 100%.

[Chem. 14]

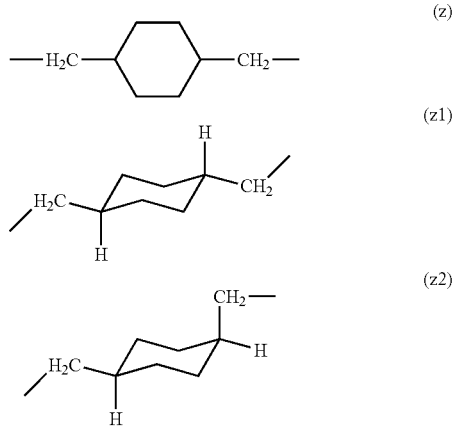

By the ratio of the trans isomer falling within the range in the 1,4-bismethylenecyclohexane skeleton, the resulting polyimide is allowed to have higher glass transition temperature (Tg). In terms of giving the polyimide with higher Tg, i.e., increased heat resistance, it is preferred that the ratio of the trans isomer be 80% to 100% and the ratio of the cis isomer be 20% to 0%.

In Formula (1a), m is a molar ratio of the structural unit represented by Formula (1a) relative to the total of the structural unit represented by Formula (1a) and the structural unit represented by Formula (1b). In Formula (1b), n is a molar ratio of the structural unit represented by Formula (1b) relative to the total of the structural unit represented by Formula (1a) and the structural unit represented by Formula (1b). The m/n ratio ranges from 99.9/0.1 to 50.0/50.0. By m/n falling within the range, the resultant polyimide is allowed to not just be excellent in colorless transparency and ultraviolet ray transmittance, but also have such heat resistance to give Tg of 260° C. or higher as well as flexibility.

In terms of e.g., making these properties much superior, m/n preferably ranges from 99.9/0.1 to 70.0/30.0, more preferably ranges from 99.5/0.5 to 80.0/20.0, and still more preferably ranges from 99.5/0.5 to 90.5/9.5. Particularly, when in Formulae (1a) and (1b) R is a group represented by (x1), it is desired that m/n fall within the above range. If m/n is below the lower limit, Tg tends to be significantly lowered, which is not preferred in terms of heat resistance. On the other hand, if m/n exceeds the upper limit, flexibility tends to be insufficient.

The structural unit represented by Formula (1a) and the structural unit represented by Formula (1b) are bonded to each other, wherein the way these structural units are boned to each other is not particularly limited, and for example may be random, or block-wise where the respective units are plurally continuous, and these bonding forms may be mixed.

In a preferred embodiment of the polyimide of the present invention, the R is a group represented by (x1), namely the embodiment where the structural unit derived from the tetracarboxylic dianhydride contained in the polyimide is a structural unit derived from bis(3,4-dicarboxyphenyl)ether dianhydride.

The polyimide of the present invention may be constituted of the structural unit represented by Formula (1a) and the structural unit represented by Formula (1b) alone; but in a range where the effects of the present invention are not impaired, may contain other structural units in addition to the structural unit represented by Formula (1a) and the structural unit represented by Formula (1b).

Examples of such other structural units include:

a structural unit obtained by allowing 1,4-cyclohexanediamine or 1,4-bis(aminomethyl)cyclohexane to react with a tetracarboxylic dianhydride other than bis(3,4-dicarboxyphenyl)ether dianhydride, 3,3',4,4'-diphenylsulfonetetracarboxylic dianhydride and 2,2-bis(3,4-dicarboxyphenyl)-1,1,1,3,3,3-hexafluoropropane dianhydride;

a structural unit obtained by allowing a diamine other than 1,4-cyclohexanediamine and 1,4-bis(aminomethyl)cyclohexane to react with 1,4-bis(aminomethyl)cyclohexane, and with bis(3,4-dicarboxyphenyl)ether dianhydride, 3,3',4,4'-diphenylsulfonetetracarboxylic dianhydride or 2,2-bis(3,4-dicarboxyphenyl)-1,1,1,3,3,3-hexafluoropropane dianhydride; and a structural unit obtained by allowing a diamine other than 1,4-cyclohexanediamine and 1,4-bis(aminomethyl)cyclohexane to react with a tetracarboxylic dianhydride other than bis(3,4-dicarboxyphenyl)ether dianhydride, 3,3',4,4'-diphenylsulfonetetracarboxylic dianhydride and 2,2-bis(3,4-dicarboxyphenyl)-1,1,1,3,3,3-hexafluoropropane dianhydride.

The tetracarboxylic dianhydride may be used singly, or may be used in combination of two or more kinds. In order to introduce branching into the polyimide, for example, part of the tetracarboxylic dianhydrides may be replaced with e.g., hexacarboxylic trianhydride or octacarboxylic tetraanhydride. The diamine may be used singly, or may be used in combination of two or more kinds.

The content of such other structural units contained in the diamine is not particularly limited as long as the effects of the present invention are not impaired, but is generally 10 mol to 0 mol and preferably 9 mol to 0 mol based on 100 mol of the total of the structural unit represented by Formula (1a) and the structural unit represented by Formula (1b).

It is preferred that the polyimide of the present invention be soluble in an aprotic polar solvent. The polyimide being soluble meant in the present invention refers to polyimide in an amount of 10 g/l or more, preferably 100 g/l or more being soluble. An example of the aprotic polar solvent is an aprotic amide-based solvent. Examples of the aprotic amide-based solvent include N,N-dimethylformamide, N,N-dimethylacetamide, N,N-diethylacetamide, N-methyl-2-pyrrolidone, 1,3-dimethyl-2-imidazolidinone, N-methylcaprolactam, and hexamethylphosphorotriamide. Preferred among these amide-based solvents are N,N-dimethylformamide, N,N-dimethylacetamide, N,N-diethylacetamide, N-methyl-2-pyrrolidone, and 1,3-dimethyl-2-imidazolidinone.

A solution of the polyimide obtained in the present invention (solvent: p-chlorophenol/phenol=9/1 (weight ratio), concentration: 0.5 g/dl) has a logarithmic viscosity at 35° C. which is preferably in the range of 0.1 to 3.0 dl/g. When the logarithmic viscosity falls within the range, the polyimide has a practical molecular weight, making it easy to apply the solution having desired concentration of solid contents. If the logarithmic viscosity is excessively high, generally polymerization is difficult and in some cases, the solubility is low.

Tg of the polyimide of the present invention, in terms of e.g., increasing heat resistance, is preferably 260° C. or higher, and more preferably 280° C. or higher. Tg of the polyimide can be determined, for example, by performing TMA measurement through procedures set forth below: a test piece of the polyimide (5 mm×22 mm, thickness: about 10 to 50 µm) is subjected to TMA measurement using a measuring instrument TMA-50 (manufactured by Shimadzu Corporation) under the conditions of the temperature range being from 25 to 350° C., a heating rate of 5° C./min, a load of 14 g/mm$^2$, and under a tensile mode. From an inflection point of a temperature-elongation of the test piece curve obtained, the glass transition temperature (Tg) can be determined.

A film formed from the polyimide of the present invention has a coefficient of linear thermal expansion which is preferably not more than 30 ppm/K, and more preferably not more than 20 ppm/K for reasons such as reducing warpage of circuit substrates, described later. The coefficient of thermal expansion of the film can be determined from a slope in the range of 100° C. to 200° C. in the temperature-elongation curve of the test piece obtained in the above-described TMA measurement.

The polyimide of the present invention has a tensile modulus (dumbbell test piece: benchmark width: 5 mm, tensile rate: 30 mm/min) which is preferably 100 to 200 MPa. The polyimide with such tensile modulus is employable as a material with sufficient strength for various applications including optical uses.

The polyimide of the present invention has a tensile elongation (dumbbell test piece: benchmark width: 5 mm, tensile rate: 30 mm/min) which is preferably 10% or more. The polyimide with such tensile elongation can be suitably used for, e.g., film applications requiring flexibility, such as flexible films.

The polyimide of the present invention, when formed into a film with a thickness of 30 µm, has a total light transmittance as measured in accordance with JIS K 7105 which is preferably 80% or more, and more preferably 82% or more.

The polyimide of the present invention, when formed into a film with a thickness of 10 µm, has a light transmittance at a wavelength of 365 nm which is preferably 30% or more, and more preferably 35% or more. By the light transmittance at a wavelength of 365 nm falling within the range, the polyimide of the present invention can be suitably used for applications requiring ultraviolet ray irradiation (for example, curing of an ultraviolet ray polymerizable compound).

Conventional polyimides have been mainly colored films, the color for example being yellow and brown. However, the polyimide of the present invention, when measured in L*a*b* color system defined in JIS Z 8729, has an absolute value of b* (its plus value representing yellowish, its minus value representing bluish) which is preferably not more than 3, and more preferably b* is from 0 to 3. By the b* value being in the above range, the polyimides can be suitably used which are not yellow, i.e., which are colorless and transparent.

The polyimide of the present invention may be used as a film. The film as used herein includes a layer. Specifically, the film including the polyimide of the present invention contains the polyimide of the present invention, and may further contain optionally another component such as a cured product of a photopolymerizable compound. The film of the present invention may be a multilayer film containing at least one layer formed from the polyimide of the present invention.

The polyamic acid of the present invention is characterized by containing the structural unit represented by Formula (2a) and the structural unit represented by Formula (2b).

[Chem. 15]

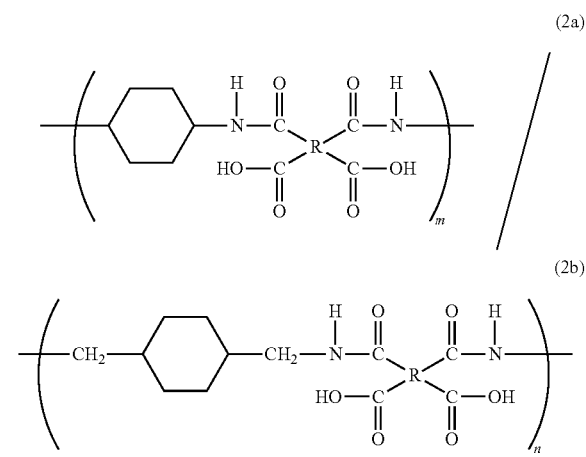

The polyamic acid of the present invention serves also as a precursor of the above polyimide.

Specifically, the structural unit represented by Formula (2a) corresponds to the structural unit represented by Formula (1a). The structural unit represented by Formula (2a) is a structural unit obtained by allowing 1,4-cyclohexanediamine to react with at least one tetracarboxylic dianhydride selected from bis(3,4-dicarboxyphenyl)ether dianhydride, 3,3',4,4'-diphenylsulfonetetracarboxylic dianhydride and 2,2-bis(3,4-dicarboxyphenyl)-1,1,1,3,3,3-hexafluoropropane dianhydride. The structural unit represented by Formula (2b) corresponds to the structural unit represented by Formula (1b). The structural unit represented by Formula (2b) is a structural unit obtained by allowing 1,4-bis(aminomethyl)cyclohexane to react with at least one acid anhydride selected from bis(3,4-dicarboxyphenyl)ether dianhydride, 3,3',4,4'-diphenylsulfonetetracarboxylic dianhydride and 2,2-bis(3,4-dicarboxyphenyl)-1,1,1,3,3,3-hexafluoropropane dianhydride.

Thus, the cyclohexane skeleton (y) in Formula (2a) comprises 60% to 100% of a trans isomer represented by Formula (y1) and 40% to 0% of a cis isomer represented by Formula (y2), wherein the trans isomer and the cis isomer total 100%.

[Chem. 16]

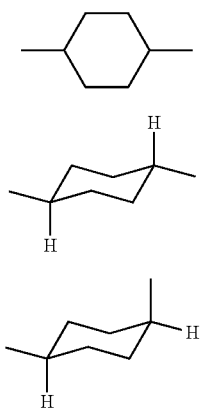

(y)
(y1)
(y2)

In the cyclohexane skeleton, it is preferred that the ratio of the trans isomer be 70% to 100%, and the ratio of the cis isomer be 30% to 0%; and more preferred that the ratio of the trans isomer be 80% to 100%, and the ratio of the cis isomer be 20% to 0%.

The 1,4-bismethylenecyclohexane skeleton (z) in Formula (2b) comprises 60% to 100% of a trans isomer represented by Formula (z1) and 40% to 0% of a cis isomer represented by Formula (z2), wherein the trans isomer and the cis isomer total 100%.

[Chem. 17]

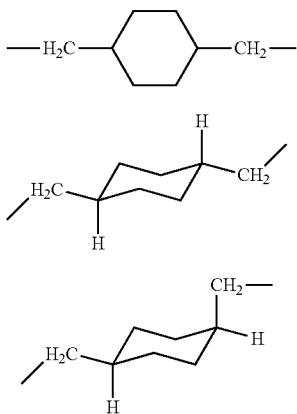

(z)
(z1)
(z2)

In the 1,4-bismethylenecyclohexane skeleton, it is preferred that the ratio of the trans isomer be 80% to 100%, and the ratio of the cis isomer be 20% to 0%.

R and m in Formula (2a) are synonymous with R and m in Formula (1a); and R and n in Formula (2b) are synonymous with R and n in Formula (1b). The m/n ratio ranges from 99.9/0.1 to 50.0/50.0, preferably ranges from 99.0/0.1 to 70.0/30.0, more preferably ranges from 99.5/0.5 to 80.0/20.0, and still more preferably ranges from 99.5/0.5 to 90.5/9.5. Particularly, when in Formulae (2a) and (2b), R is a group represented by (x1), it is desired that m/n be in the above range.

The structural unit represented by Formula (2a) and the structural unit represented by Formula (2b) are bonded to each other, wherein the way these structural units are bonded to each other is not particularly limited, and for example may be random, or block-wise where the respective units are plurally continuous, and these bonding forms may be mixed.

In a preferred embodiment of the polyamic acid of the present invention, the R is a group represented by (x1), namely the embodiment where the structural unit derived from the tetracarboxylic dianhydride contained in the polyamic acid is a structural unit derived from bis(3,4-dicarboxyphenyl)ether dianhydride.

The polyamic acid of the present invention may be constituted of the structural unit represented by Formula (2a) and the structural unit represented by Formula (2b) alone; but in a range where the effects of the present invention are not impaired, may contain other structural units in addition to the structural unit represented by Formula (2a) and the structural unit represented by Formula (2b). Examples of such other structural units include:

a structural unit obtained by allowing 1,4-cyclohexanediamine or 1,4-bis(aminomethyl)cyclohexane to react with a tetracarboxylic dianhydride other than bis(3,4-dicarboxyphenyl)ether dianhydride, 3,3',4,4'-diphenylsulfonetetracarboxylic dianhydride and 2,2-bis(3,4-dicarboxyphenyl)-1,1,1,3,3,3-hexafluoropropane dianhydride;

a structural unit obtained by allowing a diamine other than 1,4-cyclohexanediamine and 1,4-bis(aminomethyl)cyclohexane to react with 1,4-bis(aminomethyl)cyclohexane, and with bis(3,4-dicarboxyphenyl)ether dianhydride, 3,3',4,4'-diphenylsulfonetetracarboxylic dianhydride or 2,2-bis(3,4-dicarboxyphenyl)-1,1,1,3,3,3-hexafluoropropane dianhydride; and a structural unit obtained by allowing a diamine other than 1,4-cyclohexanediamine and 1,4-bis(aminomethyl)cyclohexane to react with a tetracarboxylic dianhydride other than bis(3,4-dicarboxyphenyl)ether dianhydride, 3,3',4,4'-diphenylsulfonetetracarboxylic dianhydride and 2,2-bis(3,4-dicarboxyphenyl)-1,1,1,3,3,3-hexafluoropropane dianhydride.

The tetracarboxylic dianhydride may be used singly, or may be used in combination of two or more kinds. In order to introduce branching into the polyimide, for example, part of the tetracarboxylic dianhydride may be replaced with e.g., hexacarboxylic trianhydride or octacarboxylic tetraanhydride.

The content of such other structural units contained in the polyamic acid is not particularly limited as long as the effects of the present invention are not impaired, but is generally 10 mol to 0 mol, and preferably 9 mol to 0 mol based on 100 mol of the total of the structural unit represented by Formula (1a) and the structural unit represented by Formula (1b).

A solution of the polyamic acid obtained in the present invention (solvent: N-methyl-2-pyrrolidone, concentration: 0.5 g/dl) has a logarithmic viscosity at 35° C. which is preferably in the range of 0.1 to 3.0 dl/g. When the logarithmic viscosity falls within the range, application of the polyamic acid solution to e.g., a substrate is easy, and its usage suitably as a polyamic acid varnish is possible.

The polyamic acid of the present invention is obtained, for example, by allowing a diamine mixture containing 1,4-cyclohexanediamine and 1,4-bis(aminomethyl)cyclohexane to undergo polyaddition reaction with a tetracarboxylic dianhydride containing at least one selected from bis(3,4-dicarboxyphenyl)ether dianhydride, 3,3',4,4'-diphenylsulfonetetracarboxylic dianhydride and 2,2-bis(3,4-dicarboxyphenyl)-1,1,1,3,3,3-hexafluoropropane dianhydride.

A molar ratio of 1,4-cyclohexanediamine to 1,4-bis(aminomethyl)cyclohexane in the diamine mixture is such that the m/n ratio of the structural unit represented by Formula (2a)

to the structural unit represented by Formula (2b) in the resultant polyamic acid falls within the above desired range.

Thus, in the diamine mixture, a molar ratio of 1,4-cyclohexanediamine/1,4-bis(aminomethyl)cyclohexane preferably ranges from 99.9/0.1 to 50.0/50.0, more preferably ranges from 99.9/0.1 to 70.0/30.0, still more preferably ranges from 99.5/0.5 to 80.0/20.0, and particularly preferably ranges from 99.5/0.5 to 90.5/9.5. Particularly when the tetracarboxylic dianhydride is bis(3,4-dicarboxyphenyl) ether dianhydride, it is desired that the molar ratio of 1,4-cyclohexanediamine/1,4-bis(aminomethyl)cyclohexane be in the above range.

The diamine mixture may contain other diamines in addition to 1,4-cyclohexanediamine and 1,4-bis(aminomethyl)cyclohexane in a range where the effects of the present invention are not impaired. The tetracarboxylic dianhydride may contain other tetracarboxylic dianhydrides in addition to bis(3,4-dicarboxyphenyl)ether dianhydride, 3,3',4,4'-diphenylsulfonetetracarboxylic dianhydride and 2,2-bis(3,4-dicarboxyphenyl)-1,1,1,3,3,3-hexafluoropropane dianhydride, in a range where the effects of the present invention are not impaired. In order to introduce branching into the polyimide, for example, part of the tetracarboxylic dianhydrides may be replaced with e.g., hexacarboxylic trianhydride or octacarboxylic tetraanhydride. It is desired that such other diamines, other tetracarboxylic dianhydrides and the like be used in such an amount that the content of such other structural units contained in the polyamic acid fall within the above-mentioned range The polyaddition reaction for producing the polyamic acid is performed preferably in a reaction solvent. Examples of the reaction solvent are aprotic polar solvents and water-soluble alcohol-based solvents.

Examples of the aprotic polar solvents include N-methylpyrrolidone, N,N-dimethylformamide, N,N-dimethylacetamide, 1,3-dimethyl-2-imidazolidinone, dimethylsulfoxide, hexamethylphosphoramide; and ether-based compounds such as 2-methoxyethanol, 2-ethoxyethanol, 2-(methoxymethoxy)ethoxyethanol, 2-isopropoxyethanol, 2-butoxyethanol, tetrahydrofurfuryl alcohol, diethylene glycol, diethylene glycol monomethyl ether, diethylene glycol monoethyl ether, diethylene glycol monobutyl ether, triethylene glycol, triethylene glycol monoethyl ether, tetraethylene glycol, 1-methoxy-2-propanol, 1-ethoxy-2-propanol, dipropylene glycol, dipropylene glycol monomethyl ether, dipropylene glycol monoethyl ether, tripropylene glycol monomethyl ether, polyethylene glycol, polypropylene glycol, tetrahydrofuran, dioxane, 1,2-dimethoxyethane, diethylene glycol dimethyl ether, and diethylene glycol diethyl ether.

Examples of the water-soluble alcohol-based solvents include methanol, ethanol, 1-propanol, 2-propanol, tert-butyl alcohol, ethylene glycol, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, 1,2,6-hexanetriol, and diacetone alcohol.

The reaction solvent may be used singly, or may be used in combination of two or more kinds.

Preferred among these reaction solvents are aprotic polar solvents; and more preferred are N,N-dimethylacetamide, N-methylpyrrolidone, 1,3-dimethyl-2-imidazolidinone, and mixtures thereof.

The atmosphere under which the polyamic acid is polymerized is not limited as long as polymerization is not inhibited, but is desirably a nitrogen atmosphere.

When the polymerization is performed in the reaction solvent, it is done such that the solid content concentration in the resultant polyimide is, for example, about 30% by weight. The polymerization is performed such that the molar ratio of the diamine mixture to the tetracarboxylic dianhydride is generally about 0.9 to 1.1. The polymerization time, which depends on polymerization temperature, is generally about 1 to 50 hours. To promote the reaction, the polymerization solution may be heated. The polymerization temperature is generally 40 to 120° C., and preferably 60 to 100° C.

The polyamic acid thus obtained is dissolved in a solvent to prepare a polyamic acid varnish. The solvent of the polyamic acid varnish is preferably an aprotic polar solvent. For the aprotic polar solvent, there can be mentioned the same compounds for the aprotic polar solvents employed as the reaction solvents used for the production of the polyamic acid, and their preferred compounds are also the same. The concentration of the polyamic acid contained in the polyamic acid varnish is not particularly limited. If the concentration is high, solvent removal by drying tends to be facilitated, and thus the concentration of the polyamic acid is preferably 15% by weight or more. On the other hand, if the concentration is excessively high, the application of the polyamic acid varnish tends to be difficult. It is thus preferred that the concentration of the polyamic acid be not more than 50% by weight. The polyamic acid varnish may contain photosensitivity-imparting components (e.g., photopolymerizable compounds, photopolymerization initiators), and additives described later such as inorganic fillers.

The polyamide acid varnish is applied to, for example, a carrier film, and then a solvent residue is removed, whereby a dry film containing the polyamic acid of the present invention can be prepared. If heating is carried out (prebaking) in order to remove the solvent residue, the heating temperature is generally about 80 to 150° C.

For instance in the case where the dry film has photosensitivity, the carrier film mentioned above is desired in some cases to have such transparency as to allow the dry film to be exposed as well as have low moisture-permeability. It is thus preferred that the carrier film be a transparent film such as polyethylene terephthalate, polyethylene and polypropylene.

It is preferred that the amount of the solvent residue in the dry film be regulated to be below a certain level. The amount of the solvent residue in the dry film preferably ranges from 3 to 20% by mass and more preferably not more than 10% by mass in order to control for the solubility in an aqueous alkali solution to be in an appropriate range. The dry film, if containing a large amount of the solvent residue, easily has an increased solubility rate with respect to an aqueous alkali solution.

The amount of the solvent residue in the dry film can be determined, for example, by gas chromatography (GC) measurement: an area of a peak representing the solvent in the resultant chart is calculated, and the calculated area is compared with a calibration curve of the solvent previously prepared.

The GC measurement can be performed, for example, in the following manner. An electric furnace-type pyrolyzer (for example, PYR-2A manufactured by Shimadzu Corporation) is connected to a gas chromatograph mass spectrometer (for example, GC-8A manufactured by Shimadzu Corporation (column UniportHP80/100KG-02)) wherein the injector temperature and the detector temperature are set at 200° C., and the column temperature is set at 170° C.; the dry film is introduced into the electric furnace-type pyrolyzer, and immediately thereafter heated to 320° C. to generate volatile components; and the volatile components are analyzed with the gas chromatograph mass spectrometer.

The dry film has a thickness which varies depending on uses, but for use in e.g., an interlayer insulation film of a circuit substrate, is preferably 1 μm to 100 μm, and more preferably 5 μm to 50 μm.

A surface of the dry film may be protected further with a cover film. The cover film is not particularly limited as long as it is a film with low moisture permeability.

The dry film may contain photosensitivity-imparting components (e.g., photopolymerizable compounds, photopolymerization initiators) and additives described later such as inorganic fillers.

The polyimide of the present invention described above is prepared, for example, by imidizing the polyamic acid obtained in the foregoing manner (dehydration condensation reaction). Means for imidization is not particularly limited, but for example may be carried out thermally or chemically as described below.

(1) Polyamic acid in a solvent is heated to, for example, about 100 to 400° C. to be imidized (thermal imidization).

(2) Polyamic acid in a solvent is chemically imidized by using acetic anhydride (chemical imidization)

(3) Polyamic acid in a solvent is imidized, in the presence or absence of a catalyst, in the presence of a solvent for azeotropic dehydration (azeotropic dehydration ring-closure method)

The dry film prepared from the polyamic acid varnish may be heated at 20° C. to 400° C., preferably 150° C. to 350° C., and still more preferably 200° C. to 300° C., for a period of time ranging from about 1 second to 5 hours for imidization in order to prepare the polyimide.

The polyimide of the present invention can be produced by a production process including:

a step of allowing 1,4-cyclohexanediamine to react with a tetracarboxylic dianhydride containing at least one selected from bis(3,4-dicarboxyphenyl)ether dianhydride, 3,3',4,4'-diphenylsulfonetetracarboxylic dianhydride and 2,2-bis(3,4-dicarboxyphenyl)-1,1,1,3,3,3-hexafluoropropane dianhydride, to produce a polyamic acid (1) containing a structural unit represented by Formula (3a), a step of allowing 1,4-bis(aminomethyl)cyclohexane to react with a tetracarboxylic dianhydride containing at least one selected from bis(3,4-dicarboxyphenyl)ether dianhydride, 3,3',4,4'-diphenylsulfonetetracarboxylic dianhydride and 2,2-bis(3,4-dicarboxyphenyl)-1,1,1,3,3,3-hexafluoropropane dianhydride, to produce a polyamic acid (2) containing a structural unit represented by Formula (3b), a step of mixing the polyamic acid (1) with the polyamic acid (2) such that a molar ratio of the structural unit represented by Formula (3a)/the structural unit represented by Formula (3b) ranges from 99.9/0.1 to 50.0/50.0, to produce a polyamic acid mixture, and a step of imidizing the polyamic acid mixture.

[Chem. 18]

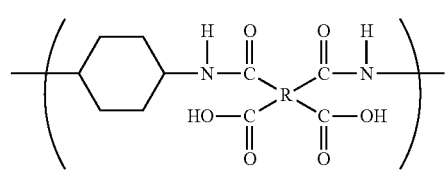

(3a)

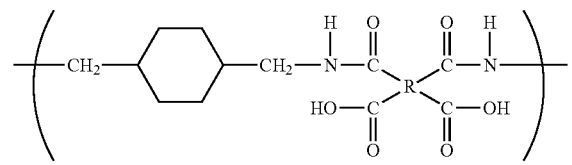

(3b)

In Formulae (3a) and (3b), R is a group represented by Formula (x1), (x2) or (x3),

[Chem. 19]

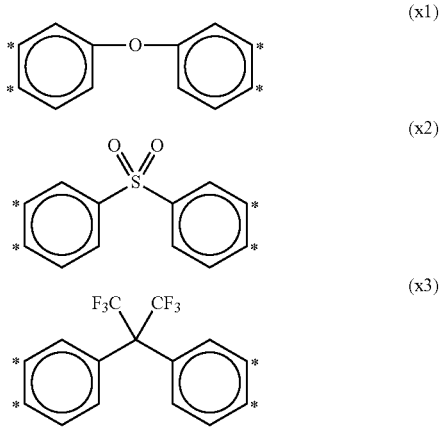

In Formulae (x1), (x2) and (x3), * is a carbon atom bonding to a carbon atom of C=O adjacent to R, and when plural Rs are contained in the polymer, those groups may be the same or different from each other, A molar ratio of the structural unit represented by Formula (3a)/the structural unit represented by Formula (3b) preferably ranges from 99.9/0.1 to 70.0/30.0, more preferably ranges from 99.5/0.5 to 80.0/20.0, and still more preferably ranges from 99.5/0.5 to 90.5/9.5. Particularly when R of Formulae (3a) and (3b) is a group represented by Formula (x1), the molar ratio of the structural unit represented by Formula (3a)/the structural unit represented by Formula (3b) is desirably in the above range.

Production conditions for the polyamic acid (1) and the polyamic acid (2) are the same as those for the polyamic acid of the present invention. The imidization may be carried out under the same conditions as the above-described imidization conditions.

The polyimide of the present invention may further have various additives added thereto as needed to be provided as a polyimide resin composition. Examples of the additives include inorganic fillers, organic fillers, wear resistance enhancing agents, flame retardance enhancing agents, tracking resistance enhancing agents, acid resistance enhancing agents, thermal conductivity enhancing agents, defoaming agents, leveling agents, surface tension regulating agents and colorants.

Examples of the inorganic fillers include metal oxides such as titanium oxide, zinc oxide, magnesium oxide, alumina and silica; inorganic metal salts such as calcium carbonate, magnesium carbonate, barium titanate, barium sulfate, calcium sulfate, magnesium sulfate, aluminum sulfate, magnesium chloride, basic magnesium carbonate, precipitated barium sulfate and precipitated barium carbonate; metal hydroxides such as magnesium hydroxide, aluminum hydroxide and calcium hydroxide; and clay minerals such as talc, natural mica, synthetic mica and kaolin.

The shape of particles of the inorganic fillers is not particularly limited, and may be needle-shape, plate-shape, or spherical-shape. The inorganic fillers have an average particle diameter which is preferably 0.05 μm to 5 μm and more preferably 0.05 μm to 2 μm.

The inorganic filler is contained, with respect to 100 parts by weight of the polyimide, preferably in an amount of 10 to 500 parts by weight, and more preferably 20 to 400 parts by weight. At these ranges, in use of the film formed from the polyimide as a light reflecting plate for example, its light reflectance is sufficient and its film strength is hardly lowered.

Examples of the organic fillers include fine particles of resins such as epoxy resins, melamine resins, urea resins, acrylic resins, polyimides, tetrafluoroethylene-based resins, polyethylene, polyester and polyamide, the fine particles being insoluble in a solvent used for the varnish.

The colorants may be organic-based or inorganic-based, or a fluorescent pigment. The color of the colorants, which is not particularly limited, is appropriately selected depending on applications. The polyimide film of the present invention, when used as a light reflecting material for example, may contain a whitening agent such as a fluorescent brightening agent in order to have increased light reflectance.

The polyimide resin composition described above can be given by preparing a polyamic acid resin composition containing the polyamic acid of the present invention and various additives and then imidizing the polyamic acid resin composition. The polyimide resin composition can be given also by adding various additives to the mixture of the polyamic acid (1) and the polyamic acid (2) and then imidizing the resultant mixture.

A film (polyimide film) containing the polyimide or the polyimide resin composition of the present invention is capable of having high transparency as well as having heat resistance, ultraviolet ray transmittance and flexibility. For this reason, the film containing the polyimide or the polyimide composition of the present invention may be used as an optical film.

Examples of the optical film include polarizing plate protection films, retardation films, antireflection films, electromagnetic wave shield films and transparent conductive films. The optical film may be used as a transparent substrate for a panel for use in an image display device, examples of the transparent substrate for a panel including a substrate for a flexible display, a substrate for a flat panel display, a substrate for a liquid crystal display, a substrate for an inorganic/organic EL display, a substrate for a touch panel and a substrate for electronic paper.

On the polyimide film used as a transparent substrate for a panel in an image display device, a functional layer such as a smoothing layer, a hard coat layer, a gas barrier layer and a transparent conductive layer, or another optical film may be laminated.

When the polyimide film of the present invention film is used as a transparent substrate for a panel in an image display device, that film has a glass transition temperature (Tg), a coefficient of thermal expansion and a total light transmittance which preferably falls within the same ranges as described above.

EXAMPLES

Hereinafter, the present invention will be described in more detail with reference to Examples, but the present invention is not in any way limited by these.

In Examples and Comparative Examples provided below, preparation of polyimide films and measurement of their properties were performed in the following manner.

(1) Preparation of Polyimide Film

A polyamic acid solution (varnish) obtained in each of Examples and Comparative Examples was cast on a glass substrate with a doctor blade. The glass substrate was heated from 50° C. to 280° C. over a period of 2 hours under nitrogen stream in an oven, and then maintained at 280° C. for 2 hours, to thereby imidize the cast film. The resultant cast film was peeled from the glass substrate, so that a polyimide film with a thickness ranging from 10 μm to 14 μm was obtained.

(2) Measurement of Intrinsic Logarithmic Viscosity

The resultant polyamic acid solution (varnish) was adjusted by adding N,N-dimethylacetamide (DMAc) such that its solid concentration was 0.5 g/dl. An intrinsic logarithmic viscosity (dl/g) thereof was measured at 35° C. with a Ubbelohde viscometer.

(3) Glass Transition Temperature Tg

A test piece of the polyimide film prepared (benchmark width: 5 mm, sample length: 20 mm) was subjected to TMA measurement using a measuring instrument TMA-50 (manufactured by Shimadzu Corporation) under the conditions of the temperature range being from 25 to 350° C., a heating rate of 5° C./min, a load of 14 g/mm$^2$ and under a tensile mode. From an inflection point of a temperature-elongation curve obtained, the glass transition temperature (Tg) was determined.

(4) Light Transmittance at Wavelength of 365 nm, T%@365 nm

The polyimide film prepared was subjected to ultraviolet and visible spectra measurement using MultiSpec-1500 (manufactured by Shimadzu Corporation). The light transmittance at a wavelength of 365 nm at that time was measured.

(5) b* (Indicator of Yellowish Color)

A value serving as an indicator of yellowish color of the polyimide film prepared was measured using a color-difference meter (measurement head: CM-2500d, manufactured by Konica Minolta, Inc.), with C light source being 2° and field of vision being SCI mode, on a white calibration plate. An average value of measured values obtained three times was defined as b*.

(6) Total Light Transmittance Total T

A total light transmittance of the polyimide film prepared was measured with a haze meter NDH2000 equipped with an integrating sphere, manufactured by Nippon Denshoku Industries, Co., Ltd., its light source being D65, in accordance with JIS K 7105.

(7) Tensile Strength TS and Tensile Elongation EL

From the polyimide film obtained above, a test piece punched into a dumbbell shape was prepared, and was subjected to measurement using a tensile tester (manufactured by Shimadzu Corporation, EZ-S) under the conditions of a benchmark width of 5 mm, a sample length of 30 mm and a tensile rate of 30 mm/min. From a stress-strain curve obtained, an intensity and an elongation at which the test piece fractured were respectively defined as a tensile strength and a tensile elongation, and respective average values of the measured values obtained five times were defined as a tensile strength TS and a tensile elongation EL.

(8) Calculation of Cis Isomer/Trans Isomer Ratio in 1,4-Bis (Aminomethyl)Cyclohexane $^1$H NMR (solvent: CDCl$_3$) measurement was performed, in which a cis isomer/trans isomer ratio was calculated based on an intensity ratio between signals in a predetermined magnetic field range. Specifically, calculating a ratio between NH$_2$CH$_2$ derived from the cis isomer (2.61 ppm, doublet) and NH$_2$CH$_2$ derived from the trans isomer (2.53 ppm, doublet) resulted in the trans isomer ratio being 84%.

(A) Synthesis of Polyamic Acid

Example 1

Into a 500 mL five-neck separable flask equipped with a thermometer, a stirring device and a nitrogen introducing tube, 11.3 g (0.099 mol) of 1,4-diaminocyclohexane (hereinafter referred to as CHDA; manufactured by Iwatani Industrial Gases Corp., trans isomer ratio: 99% or more), 0.140 g (0.001 mol) of 1,4-bis(aminomethyl)cyclohexane (hereinafter referred to as 14BAC; trans isomer ratio: 84%), and 223 g of N,N-dimethylacetamide (hereinafter referred to as DMAc) which was an organic solvent, were added with stirring, to give a diamine mixture solution. Further, with stirring, into that solution, 31.0 g (0.100 mol) of bis(3,4-dicarboxyphenyl)ether dianhydride (hereinafter referred to as ODPA) in the form of powder was introduced. The resultant liquid was bathed in oil bath kept at 90° C. for 1 hour to allow reaction to proceed. The liquid, which was ununiform at the beginning, turned into a transparent solution with the progress of the reaction, resulting in being a viscous polyamic acid solution. A varnish property (η) of the resultant polyamic acid solution, and properties of a film obtained according to the film formation process (Tg, T %@365 nm, b*, Total T, TS and EL) are shown in Table 1.

Example 2

A polyamic acid solution was prepared in the same manner as in Example 1, except that the feeding amount of CHDA was changed from 11.3 g to 10.9 g (0.095 mol), the feeding amount of 14BAC was changed from 0.140 g to 0.710 g (0.005 mol), and the feeding amount of DMAc was changed from 223 g to 224 g. A varnish property (η) of the resultant polyamic acid solution, and properties of a film obtained according to the film formation process (Tg, T %@365 nm, b*, Total T, TS and EL) are shown in Table 1.

Example 3

A polyamic acid solution was prepared in the same manner as in Example 1, except that the feeding amount of CHDA was changed from 11.3 g to 10.3 g (0.090 mol), the feeding amount of 14BAC was changed from 0.140 g to 1.42 g (0.010 mol), and the feeding amount of DMAc was changed from 223 g to 224 g. A varnish property (η) of the resultant polyamic acid solution, and properties of a film obtained according to the film formation process (Tg, T %@365 nm, b*, Total T, TS and EL) are shown in Table 1.

Example 4

A polyamic acid solution was prepared in the same manner as in Example 1, except that the feeding amount of CHDA was changed from 11.3 g to 9.14 g (0.080 mol), the feeding amount of 14BAC was changed from 0.140 g to 2.84 g (0.020 mol), and the feeding amount of DMAc was changed from 223 g to 226 g. A varnish property (η) of the resultant polyamic acid solution, and properties of a film obtained according to the film formation process (Tg, T %@365 nm, b*, Total T, TS and EL) are shown in Table 1.

Example 5

A polyamic acid solution was prepared in the same manner as in Example 1, except that the feeding amount of CHDA was changed from 11.3 g to 5.71 g (0.050 mol), the feeding amount of 14BAC was changed from 0.140 g to 7.11 g (0.050 mol), and the feeding amount of DMAc was changed from 223 g to 230 g. A varnish property (η) of the resultant polyamic acid solution, and properties of a film obtained according to the film formation process (Tg, T %@365 nm, b*, Total T, TS and EL) are shown in Table 1.

Comparative Example 1

A polyamic acid solution was prepared in the same manner as in Example 1, except that as a diamine 14BAC was not used, the feeding amount of CHDA was changed from 11.3 g to 11.4 g (0.100 mol), and the feeding amount of DMAc was changed from 223 g to 224 g. A varnish property (η) of the resultant polyamic acid solution, and properties of a film obtained according to the film formation process (Tg, T %@365 nm, b*, Total T, TS and EL) are shown in Table 1.

Comparative Example 2

A polyamic acid solution was prepared in the same manner as in Example 1, except that as a diamine CHDA was not used, the feeding amount of 14BAC was changed from 0.140 g to 14.2 g (0.100 mol), and the feeding amount of DMAc was changed from 223 g to 238 g. A varnish property (η) of the resultant polyamic acid solution, and properties of a film obtained according to the film formation process (Tg, T %@365 nm, b*, Total T, TS and EL) are shown in Table 1.

Comparative Example 3

A polyamic acid solution was prepared in the same manner as in Comparative Example 1, except that the feeding amount of DMAc was changed from 224 g to 189 g, and 31.0 g of ODPA was changed to 35.8 g (0.100 mol) of 3,3',4,4'-diphenylsulfonetetracarboxylic dianhydride (DSDA). A varnish property (η) of the resultant polyamic acid solution, and properties of a film obtained according to the film formation process (Tg, T %@365 nm, b*, Total T, TS and EL) are shown in Table 1.

Comparative Example 4

A polyamic acid solution was prepared in the same manner as in Comparative Example 2, except that the feeding amount of DMAc was changed from 238 g to 200 g, and 31.0 g of ODPA was changed to 35.8 g (0.100 mol) of DSDA. A varnish property (η) of the resultant polyamic acid solution, and properties of a film obtained according to the film formation process (Tg, T %@365 nm, b*, Total T, TS and EL) are shown in Table 1.

Comparative Example 5

A polyamic acid solution was prepared in the same manner as in Comparative Example 1, except that the feeding amount of DMAc was changed from 224 g to 231 g, and 31.0 g of ODPA was changed from 29.4 g (0.100 mol) of 3,3',4,4'-biphenyltetracarboxylic dianhydride (BPDA). A varnish property (η) of the resultant polyamic acid solution, and properties of a film obtained according to the film formation process (Tg, T %@365 nm, b*, Total T, TS and EL) are shown in Table 1.

Comparative Example 6

A polyamic acid solution was prepared in the same manner as in Comparative Example 2, except that the feeding amount of DMAc was changed from 238 g to 247 g, and 31.0 g of ODPA was changed to 29.4 g (0.100 mol) of 3,3',4,4'-biphenyltetracarboxylic dianhydride (BPDA). A varnish property (η) of the resultant polyamic acid solution, and properties of a film obtained according to the film formation process (Tg, T %@365 nm, b*, Total T, TS and EL) are shown in Table 1.

(B) Mixing of Polyamic Acid Solutions

Example 6

Into a 200 mL five-neck separable flask equipped with a thermometer, a stirring device and a nitrogen introducing tube, 50.4 g of the polyamic acid solution obtained in Comparative Example 1 (CHDA/14BAC ratio: 100/0, concentration: 16% by weight), and 2.83 g of the polyamic acid solution (CHDA/14BAC ratio: 0/100, concentration: 16% by weight) obtained in Comparative Example 2 were added with stirring, to give a mixture solution. The CHDA/14BAC ratio in the mixture solution (i.e., m/n) was 95/5. The mixture solution was stirred in oil bath kept at 60° C. for 1 hour and further stirred at room temperature for 12 hours. A varnish property (η) of the resultant mixture solution, and properties of a film obtained according to the film formation process (Tg, T %@365 nm, b*, Total T, TS and EL) are shown in Table 1.

Example 7

A mixture solution was prepared in the same manner as in Example 6, except that the feeding amount of the polyamic acid solution obtained in Comparative Example 1 was changed from 50.4 g to 48.3 g, and the feeding amount of the polyamic acid solution obtained in Comparative Example 2 was changed from 2.83 g to 5.09 g. A varnish property (η) of the resultant mixture solution, and properties of a film obtained according to the film formation process (Tg, T %@365 nm, b*, Total T, TS and EL) are shown in Table 1. The CHDA/14BAC ratio (i.e., m/n) in the resultant mixture liquid was 91/9.

TABLE 1

| Example/ Comparative Example | Diamine (1) CHDA | Diamine (2) 14BAC | Dianhydride | η [dl/g] | Tg [° C.] | T %@10 um 365 nm | b* [—] | Total T [%] | TS [MPa] | EL [%] | Form of Polymer |
|---|---|---|---|---|---|---|---|---|---|---|---|
| Example 1 | 99 | 1 | ODPA | 0.99 | 312 | 37.2 | 3.0 | 89 | 140 | 18 | random |
| Example 2 | 95 | 5 | ODPA | 0.98 | 310 | 39.3 | 2.9 | 89 | 152 | 24 | random |
| Example 3 | 90 | 10 | ODPA | 0.97 | 307 | 40.2 | 2.6 | 89 | 131 | 18 | random |
| Example 4 | 80 | 20 | ODPA | 0.90 | 297 | 44.4 | 2.5 | 89 | 130 | 20 | random |
| Example 5 | 50 | 50 | ODPA | 0.90 | 268 | 47.0 | 2.4 | 88 | 127 | 24 | random |
| Example 6 | 95 | 5 | ODPA | 0.72 | 311 | 41.2 | 2.9 | 88 | 130 | 15 | blend |
| Example 7 | 91 | 9 | ODPA | 0.78 | 306 | 39.6 | 2.8 | 88 | 163 | 28 | blend |
| Comp. Ex. 1 | 100 | 0 | ODPA | 1.08 | 317 | 40.9 | 3.7 | 88 | 133 | 9 | (homo) |
| Comp. Ex. 2 | 0 | 100 | ODPA | 0.69 | 227 | 53.6 | 2.3 | 88 | 121 | 32 | (homo) |
| Comp. Ex. 3 | 100 | 0 | DSDA | 0.70 | 308 | 57.3 | 5.1 | 89 | 146 | 10 | (homo) |
| Comp. Ex. 4 | 0 | 100 | DSDA | 0.45 | 273 | 67.4 | 3.2 | 89 | 133 | 17 | (homo) |
| Comp. Ex. 5 | 100 | 0 | BPDA | 1.01 | 327 | 0.9 | 1.4 | 88 | 227 | 8 | (homo) |
| Comp. Ex. 6 | 0 | 100 | BPDA | 0.93 | 265 | 0.6 | 1.1 | 89 | 122 | 34 | (homo) |

INDUSTRIAL APPLICABILITY

The polyimide obtained according to the present invention is excellent not just in heat resistance and colorless transparency, but in flexibility and transmittance of ultraviolet ray, particularly a long-wavelength ultraviolet ray (for example, ultraviolet ray at 365 nm), and therefore are useful in various applications including electric/electronic materials such as substrates for flexible display and flexible circuit substrates, and optical materials.

The invention claimed is:
1. A polyimide comprising a structural unit represented by Formula (1a) and a structural unit represented by Formula (1b),

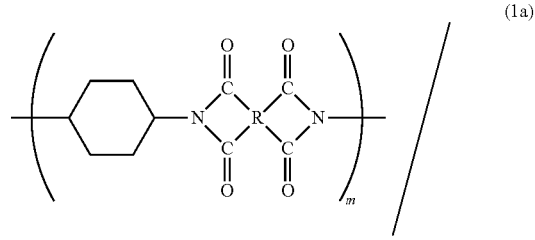

(1a)

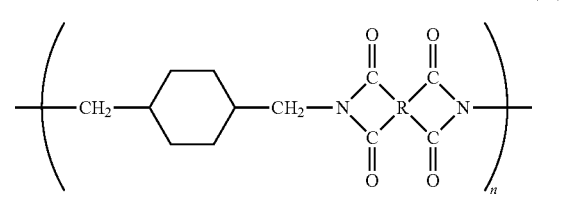

(1b)

wherein in Formulae (1a) and (1b), R is a group represented by Formula (x1), (x2) or (x3),

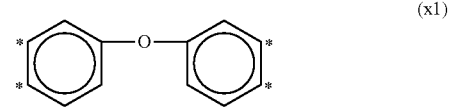

(x1)

-continued

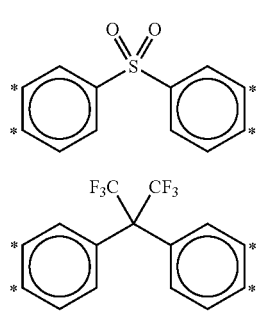
(x2)

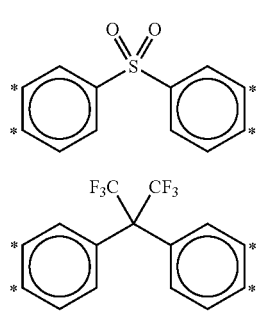
(x3)

wherein in Formulae (x1), (x2) and (x3), * is a carbon atom bonding to a carbon atom of C=O adjacent to R, and when plural Rs are contained, those groups may be the same or different from each other, m is a molar ratio of the structural unit represented by Formula (1a) relative to the total of the structural unit represented by Formula (1a) and the structural unit represented by Formula (1b), n is a molar ratio of the structural unit represented by Formula (1b) relative to the total of the structural unit represented by Formula (1a) and the structural unit represented by Formula (1b) (m+n=100%) wherein m/n ranges from 99.9/0.1 to 50.0/50.0, the structural unit represented by Formula (1a) and the structural unit represented by Formula (1b) are bonded to each other, and the bonding form is random, a cyclohexane skeleton (y) in Formula (1a) comprises 60% to 100% of a trans isomer represented by Formula (y1) and 40% to 0% of a cis isomer represented by Formula (y2) wherein the trans isomer and the cis isomer total 100%, and

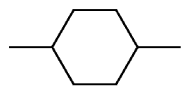
(y)

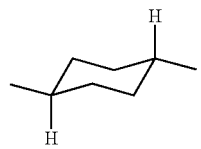
(y1)

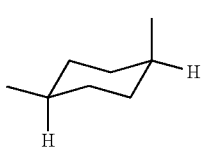
(y2)

a 1,4-bismethylenecyclohexane skeleton (z) in Formula (1b) comprises 60% to 100% of a trans isomer represented by Formula (z1) and 40% to 0% of a cis isomer represented by Formula (z2) wherein the trans isomer and the cis isomer total 100%

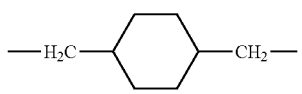
(z)

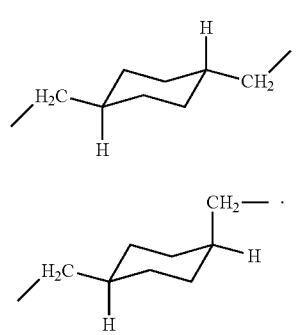
(z1)

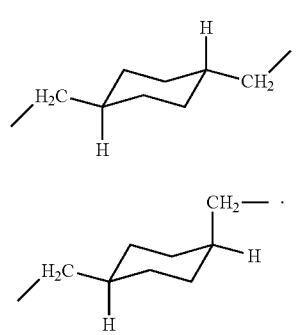
(z2)

2. The polyimide according to claim 1, wherein in Formulae (1a) and (1b), R is a group represented by Formula (x1).

3. A polyamic acid comprising a structural unit represented by Formula (2a) and a structural unit represented by Formula (2b),

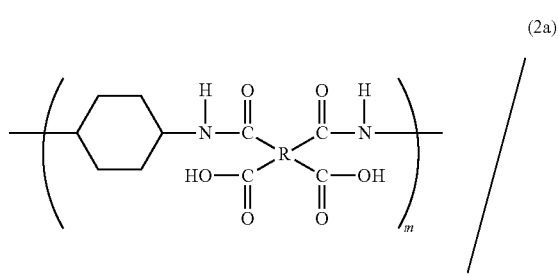
(2a)

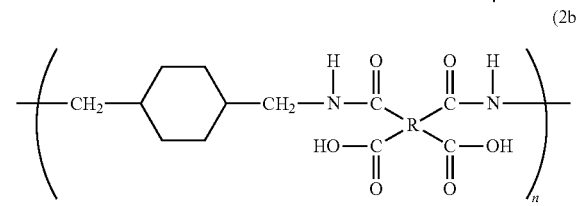
(2b)

wherein in Formula (2a) and (2b), R is a group represented by Formula (x1), (x2) or (x3),

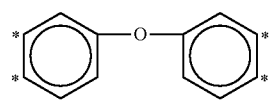
(x1)

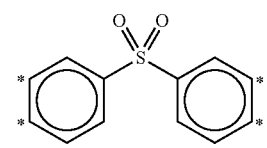
(x2)

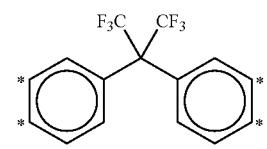
(x3)

wherein in Formulae (x1), (x2) and (x3), * is a carbon atom bonding to a carbon atom of C=O adjacent to R, and when plural Rs are contained, those groups may be the same or different from each other, m is a molar ratio of the structural unit represented by Formula (2a) relative to the total of the structural unit represented by Formula (2a) and the structural unit represented by Formula (2b), n is a molar ratio of the structural unit represented by Formula (2b) relative to the total of the structural unit represented by Formula (2a) and the structural unit represented by Formula (2b) wherein m/n ranges from 99.9/0.1 to 50.0/50.0, the structural unit represented by Formula (2a) and the structural unit represented by Formula (2b) are bonded to each other, and the bonding form is random, a cyclohexane skeleton (y) in Formula (2a) comprises 60% to 100% of a trans isomer represented by Formula (y1) and 40% to 0% of a cis isomer represented by Formula (y2) wherein the trans isomer and the cis isomer total 100%, and

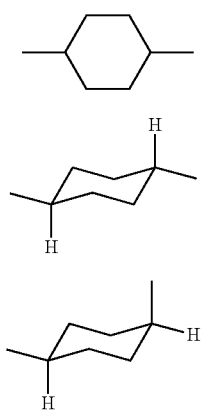

a 1,4-bismethylenecyclohexane skeleton (z) in Formula (2b) comprises 60% to 100% of a trans isomer represented by Formula (z1) and 40% to 0% of a cis isomer represented by Formula (z2) wherein the trans isomer and the cis isomer total 100%

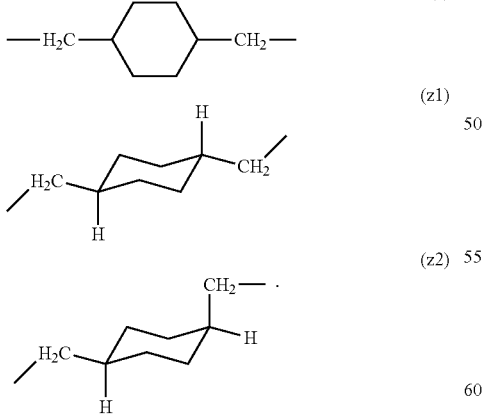

4. The polyamic acid according to claim 3, wherein in the Formulae (2a) and (2b), R is a group represented by Formula (x1).

5. A polyimide composition comprising the polyimide according to claim 1 and an inorganic filler.

6. A polyamic acid composition comprising the polyamic acid according to claim 3 and an inorganic filler.

7. A process for producing the polyamic acid according to claim 3, comprising a step of allowing a diamine mixture containing 1,4-cyclohexanediamine and 1,4-bis(aminomethyl)cyclohexane such that a molar ratio of 1,4-cyclohexanediamine/1,4-bis(aminomethyl)cyclohexane ranges from 99.9/0.1 to 50.0/50.0 to react with a tetracarboxylic dianhydride containing at least one selected from bis(3,4-dicarboxyphenyl)ether dianhydride, 3,3',4,4'-diphenylsulfonetetracarboxylic dianhydride and 2,2-bis(3,4-dicarboxyphenyl)-1,1,1,3,3,3-hexafluoropropane dianhydride.

8. A process for producing the polyimide according to claim 1, comprising:

a step of allowing 1,4-cyclohexanediamine to react with a tetracarboxylic dianhydride containing at least one selected from bis(3,4-dicarboxyphenyl)ether dianhydride, 3,3',4,4'-diphenylsulfonetetracarboxylic dianhydride and 2,2-bis(3,4-dicarboxyphenyl)-1,1,1,3,3,3-hexafluoropropane dianhydride, to produce a polyamic acid (1) containing a structural unit represented by Formula (3a);

a step of allowing 1,4-bis(aminomethyl)cyclohexane to react with a tetracarboxylic dianhydride containing at least one selected from bis(3,4-dicarboxyphenyl)ether dianhydride, 3,3',4,4'-diphenylsulfonetetracarboxylic dianhydride and 2,2-bis(3,4-dicarboxyphenyl)-1,1,1,3,3-hexafluoropropane dianhydride, to produce a polyamic acid (2) containing a structural unit represented by Formula (3b);

a step of mixing the polyamic acid (1) with the polyamic acid (2) such that a molar ratio of the structural unit represented by Formula (3a)/the structural unit represented by Formula (3b) ranges from 99.9/0.1 to 50.0/50.0, to produce a polyamic acid mixture, and a step of imidizing the polyamic acid mixture,

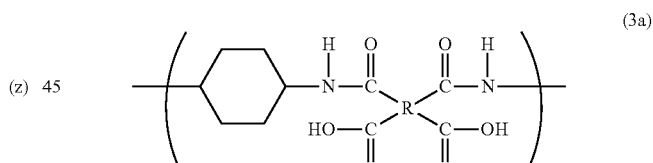

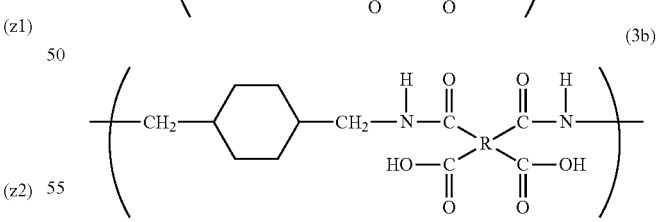

wherein in Formulae (3a) and (3b), R is a group represented by Formula (x1), (x2) or (x3),

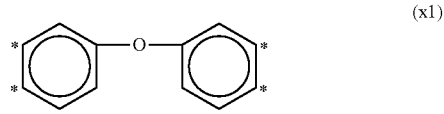

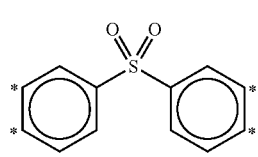
(x2)

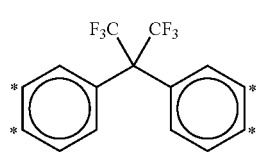
(x3)

wherein in Formulae (x1), (x2) and (x3), * is a carbon atom bonding to a carbon atom of C=O adjacent to R, and when plural Rs are contained in the polymer, those groups may be the same or different from each other.

9. A polyamic acid varnish comprising the polyamic acid according to claim 3 and a solvent.

10. A dry film comprising the polyamic acid according to claim 3.

11. A film comprising the polyimide according to claim 1.

12. An optical film comprising the film according to claim 11.

13. A substrate for a flexible display, comprising the optical film according to claim 12.

* * * * *